United States Patent [19]

Nishimura et al.

[11] Patent Number: 5,621,023
[45] Date of Patent: Apr. 15, 1997

[54] METHOD FOR MANUFACTURE OF COLORED PARTICLES

[75] Inventors: Yoshihiko Nishimura, Toyonaka; Tadamitsu Hirata, Hirakata, both of Japan

[73] Assignee: Asahipen Corporation, Japan

[21] Appl. No.: 353,540

[22] Filed: Dec. 9, 1994

[51] Int. Cl.⁶ ................................................. C08K 9/00
[52] U.S. Cl. ........................ 523/200; 523/201; 523/205; 523/206; 523/207; 523/208; 523/209; 523/210; 428/904; 524/449; 524/501
[58] Field of Search ................................. 523/200, 201, 523/205, 206, 207, 208, 209, 210; 428/904; 524/501, 449

[56] References Cited

U.S. PATENT DOCUMENTS 5,106,889 4/1992 Hirata et al. ........................ 524/423

FOREIGN PATENT DOCUMENTS

| 63-145378 | 6/1988 | Japan . |
| 2-41371 | 2/1990 | Japan . |
| 2-123171 | 5/1990 | Japan . |
| 3-137170 | 6/1991 | Japan . |
| 3-137172 | 6/1991 | Japan . |
| 6-25564 | 2/1994 | Japan . |

*Primary Examiner*—Edward J. Cain
*Attorney, Agent, or Firm*—Christensen O'Connor Johnson & Kindness PLLC

[57] ABSTRACT

To produce colored particles with a 10–200 μm average grain size simply, efficiently, and in high yields, in order to obtain suede-type paint constituents with excellent decorative features capable of producing finely detailed, marble-like, multi-color patterns. Water-insoluble particles and a polyvalent carboxylic acid resin with an acid value (solid-based) of about 20–120, either water-soluble or water-diffusing, are mixed in water; and after primary coated particles are formed on the surfaces of the water-insoluble particles on which the polyvalent carboxylic acid resin is adsorbed, a dispersion-stabilized emulsion resin containing a colored pigment is mixed in the dispersion liquid; and a metal salt is added to this mixture so that colored particles with an average particle size of about 10–200 μm with a surface colored coating are obtained. The water-insoluble particles can be either synthetic resin particles or inorganic particles.

17 Claims, 1 Drawing Sheet

METHOD FOR MANUFACTURE OF COLORED PARTICLES

FIELD OF THE INVENTION

This invention relates to a method for manufacture of colored particles and to suede-type paint constituents using the colored particles obtained by this method. The purposes of the invention are to provide a manufacturing method capable of simply and efficiently producing, in high yields, colored particles of a 10–200 μm average grain size, whose surfaces are coated with a colored paint; and to provide suede-type paint constituents that excel in decorative properties that can produce a vivid accessory effect by providing fine-texture, marble-like multicolor patterns and a feel characterized by an appropriate amount of roughness.

BACKGROUND OF THE INVENTION

Attendant to a rise in the standard of living is an increasing diversification of consumer's taste. In the area of paints used for interior and exterior painting of homes and buildings, a noticeable trend is a shift in the consumer's interest away from the conventional single-colored decor in favor of paint products that are capable of producing multi-color effects in two or more colors.

The authors of the present invention previously disclosed two patent applications designed to provide paints that were capable of producing detailed, multi-color patterns with vivid clarity, in the publications "Method for the Manufacture of Multi-Color Pattern Finish Paint Constituents," Japanese OFFICIAL GAZETTE FOR PATENT PUBLICATIONS S63-145378; and "Method for the Manufacture of Colored Polymer Powder, and Molding Methods and Paints Using the Colored Polymer Powder," Japanese OFFICIAL GAZETTE FOR PATENT PUBLICATIONS H2-41371.

The disclosed technology involved mixing the following: a mixture of colored pigments and an emulsion resin, and particles of a vinyl chloride-based synthetic resin with or without a plasticizer; adding a metal salt to the mixture; and coating the surfaces of said vinyl chloride-based synthetic resin particles with a colored paint by means of salting out. The results were colored polymer powder particles with an average grain size of 10–200 μm, and a paint that contained the colored polymer powder particles as an essential ingredient.

The technology that was disclosed by the inventors of the present invention involved a paint offering an excellent decorative property, and distinct from conventional mono-colored paints. That technology was capable of producing, by paint coating, a fine, detailed, multi-color, and marble-like texture, and offered a manufacturing method capable of producing such a paint. However, the disclosed technology was incapable of producing colored particles with an average grain size of 10–200 μm, for producing such a marble-like effect, in high yields. Therefore, the disclosed technology contained yield problems.

Moreover, if resin particles other than vinyl chloride-based resin containing a plasticizer as the core material for the colored particles were used, the colored particles could not adequately coat the surface of the particles. Therefore, the previous technology was inadequate for use as an industrial-scale manufacturing method.

In the meantime, problems such as global warming due to a buildup of carbon dioxide and environmental issues such as the depletion of the ozone layer have become increasingly important.

Against this background, the development of industrial technologies that are capable of contributing to the protection of the global environment has become a pressing worldwide issue. However, paints in which an organic synthetic resin is used as a core substance, as noted above, suffer from the problem of combustion of the paint coating in an event of a fire. This produces carbon dioxide and can worsen the problems of global warming, ozone layer destruction, and acid rain. The net result is an inability to contribute to the protection of the global environment.

SUMMARY OF THE INVENTION

This invention provides the following manufacturing method: a colored particle manufacturing method characterized in that water-insoluble particles and a polyvalent carboxylic acid resin with an acid value (solid-based) of about 20–120, either water-soluble or water-diffusing, are mixed in water; and after primary coated particles are formed through the adsorption of the polyvalent carboxylic acid on the surfaces of the water-insoluble particles, a dispersion-stabilized emulsion resin containing a colored pigment is mixed in the dispersion liquid; and a metal salt is added to this mixture so that colored particles with an average particle size of about 10–200 μm with a surface colored coating are obtained. The invention also offers a colored particle manufacturing method that is characterized in that said water-insoluble particles are inorganic particles.

Primary particles are obtained by mixing, in water, water-insoluble particles that serve as a core substance for the colored particles, and a polyvalent carboxylic acid resin, and by causing the polyvalent carboxylic acid resin to be adsorbed on the surfaces of the water-insoluble particles.

Next, a dispersion-stabilized emulsion resin containing a colored pigment is mixed in a dispersion liquid of the primary particles, and salting out is conducted by adding a metal salt in order to coat the surfaces of the primary particles with the colored paint. The result is the coating of a colored paint in high yields, in a manner unaffected by the type of particles used, and in a manner that is uniform and desirable, in order to produce colored particles with excellent decorative properties.

Further, because it can produce these decorative colored particles in a shorter manufacturing process and reduce the amount of plasticizer that is used to coat the colored paint, the present invention can improve the stain-proof capacity of the paint coat in which the colored particles are the principal ingredient, and thus can contribute to the protection of the environment. Further, the use of inorganic particles as water-insoluble particles can prevent spread of combustion in the event of a fire. Further, because the new paint does not release large quantities of a toxic gas during combustion, by formulating a paint using these colored particles as an essential ingredient, it is possible to produce interior paint products that excel in safety and environmental protection capacity.

BRIEF DESCRIPTION OF THE DRAWINGS

The invention will be described in greater detail, by way of example, with reference to the accompanying drawings, wherein.

DETAILED DESCRIPTION OF THE PREFERRED EMBODIMENT

Figure 1:
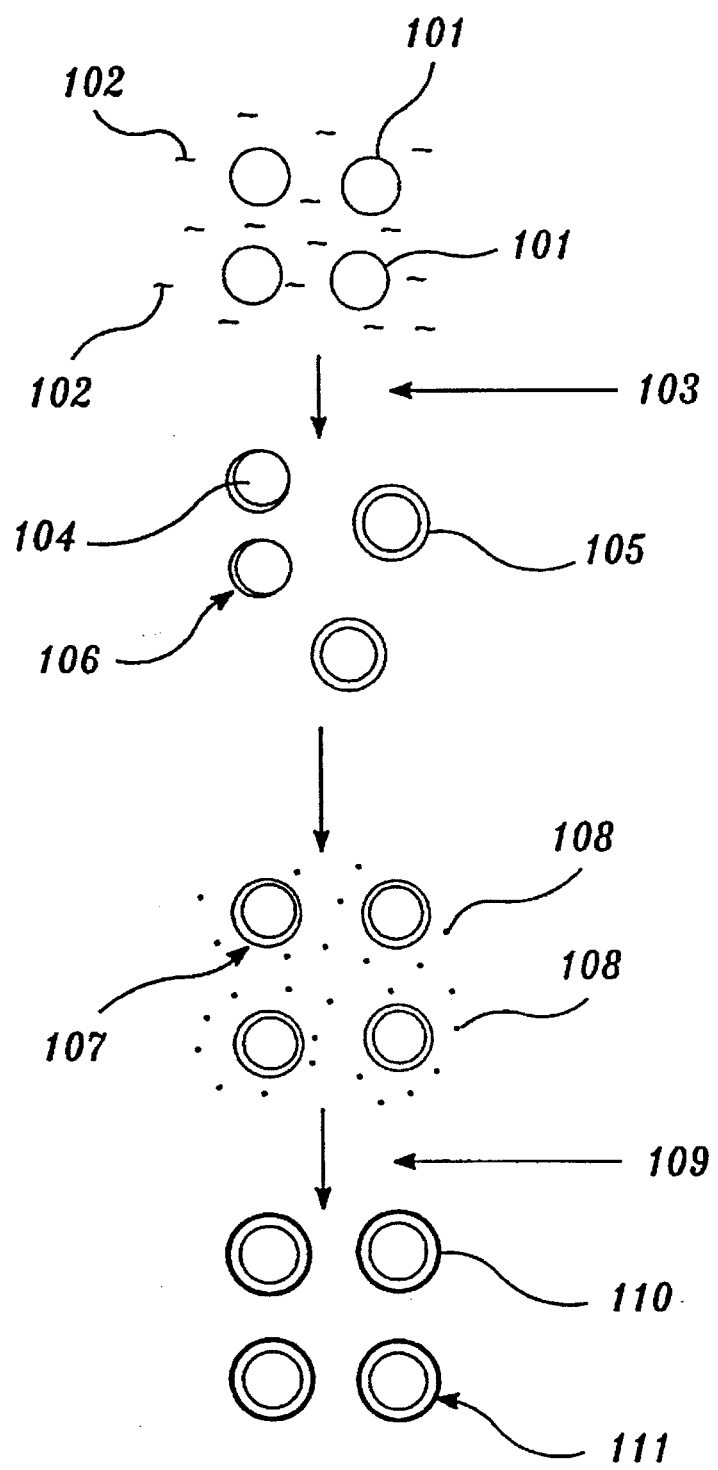
FIG. 1 is a schematic depiction of a process for manufacturing colored particles in suede-type paint constituents in accordance with the present invention.

The following is a detailed description of the colored particles manufacturing method of the present invention and the composition of the suede-type paint constituents using the colored particles that are obtained by this method.

First, the following is a detailed description of the colored particle manufacturing method.

In the manufacturing method of the present invention, first water-insoluble particles and polyvalent carboxylic acid resin are mixed in water and primary particles are formed by causing the polyvalent carboxylic acid resin to be adsorbed on the surfaces of the water-insoluble particles.

For the purposes of the present invention, any of the following water-insoluble particles can be used without any particular restriction: synthetic resin particles that are obtained by the suspension polymerization or emulsion polymerization of simple vinyl chloride polymer, vinyl chloride-vinyl acetate copolymer, ethylene chloride-vinyl copolymer, ethylene acetate vinyl chloride vinyl copolymer, urethane chloride-vinyl copolymer, chlorinated vinyl chloride copolymer, and other vinyl chloride-based resins; acryl-based resins; polyester-based resins; polyurethane-based resins; and polyurea resins; or water-insoluble particles that are chosen from: clay, kaolin, talc, calcium carbonate, alumina, and mica.

The average grain size of the water-insoluble particles used should be 10–200 μm in the final grain size of the colored particles that are obtained. More specifically, a grain size in the 8–190 μm range, when not colored, should be used.

As a polyvalent carboxylic acid resin (on a solid basis), the following substances can be used without any restriction: acryl resin obtained by the copolymerization of acrylic acid, methacrylic acid or itaconic acid; alkyd resin using phthalic acid or maleic acid, or styrene maleic acid resin, or vinyl acetate resin with a 20–120 acid value (on a solid basis) that is either water-soluble or water-dispersent.

For the purpose of the present invention, the acid value of polyvalent carboxylic acid resin should be 20–120 for the reason that an acid value less than 20 results in poor water dilution capacity, rendering the substance hardly soluble. On the other hand, an acid value greater than 120 results in too high a water dilution capacity, which prevents the resin from precipitating into water. Thus, either extreme is undesirable.

An acid value in the 20–120 range permits the favorable formation of a thin film on the surfaces of water-insoluble particles by the adsorption of polyvalent carboxylic acid resin, which, in turn, permits the desirable formation of a colored paint coating (more on this later).

Further, the polyvalent carboxylic acid resin used in this invention is either water-soluble or water-dispersant.

The reason is that a water-insoluble polyvalent carboxylic acid resin, when mixed in water, either remains solid or fails to disperse in fine particles. The result is the undesirable failure to form primary particles efficiently through adsorption onto the surfaces of water-insoluble particles. In the present invention the aforementioned water-soluble or water-dispersant acryl resin, alkyd resin, and other polyvalent carboxylic acid resin can be used by neutralizing it either partially or wholly using ammonium, triethyl amine, diethanol amine and other organic amines; or alkali such as potassium hydroxide, sodium hydroxide, and other metal salts of hydroxide.

Further, in the present invention either a plasticizer and/or solvent can be added to the polyvalent carboxylic acid resin.

The addition of either a plasticizer and/or solvent to the polyvalent carboxylic acid resin facilitates the deposition of coating of a colored paint (a dispersion-stabilized emulsion resin containing colored pigments—more on this later) on the surfaces of the primary particles thus formed. This improves the coloring capacity of the particles and promotes the coating reaction, which is desirable.

The following plasticizers can be used without particular restriction: di-2-ethylhexyl phthalate, diheptyl phthalate, di-n-octyl phthalate, dinonyl phthalate, dibutyl phthalate, butylbenzyl phthalate, diisodecyl phthalate, di-2-ethylhexyl tetrahydrophthalate and other esters of phthalic acid; di-2-ethylhexyl adipate, diisodecyl adipate, di-2-ethylhexyl sebatate and other esters of dibasic acids; tricredyl phosphate, triphenyl phosphate, trioctyl phosphate, and other esters of phosphoric acid; epoxy-based plasticizers such as the epoxy compounds of soybean oil and sunflower oil; trioctyl trimelitate, tridecyl trimelitate, and other publicly known plasticizers.

The desirable amount of these plasticizers that can be added is 1–50 parts by weight relative to 100 parts by weight of water-insoluble particles. However, there are no restrictions on the amount of plasticizer that can be added.

In the case of a water-insoluble resin with a low glass transition temperature (TG), the addition of a plasticizer is not required.

The reason is that a plasticizer additive amount less than 1 part by weight relative to 100 parts by weight of water-insoluble particles prevents an extensive enough formation of colored coating on the surfaces of primary particles. On the other hand, a plasticizer additive amount greater than 50 parts by weight results in excessively soft polyvalent carboxylic acid resin particles. This results in insufficient paint coat strength and in adhesion between particles, which hampers the extraction of the final product in the form of particles. Thus, either extreme is undesirable.

Further, as solvents, one or more alcohol-based solvents or ester-based solvents from the following can be used for good results without any particular restriction: methyl alcohol, ethyl alcohol, isopropyl alcohol, n-hexyl alcohol, n-octyl alcohol, ethylene glycol, diethylene glycol, triethylene glycol, propylene glycol, 1,3-butylene glycol, isobutyl alcohol, polyethylene glycol, and other alcohol-based solvents; or, acetone, methylethyl ketone, methylisobutyl ketone, diisobutyl ketone, acetyl acetone, cyclohexanone, and other ketone-based solvents; ethyl acetate, isopropyl acetate, and other ester-based solvents.

The above water-insoluble particles are mixed with polyvalent carboxylic acid resin in water.

The mixing can be done by either of the following methods: dispersing the water-insoluble particles in water and then mixing the polyvalent carboxylic acid resin in the dispersion liquid, or adding water-insoluble particles to a dispersion liquid of polyvalent carboxylic acid resin.

The concentration of the water-insoluble particles to be dispersed in water should be 30–70% by weight, or preferably 30–60% by weight.

The reason is that a dispersion concentration less than 30% by weight results in a less-than-adequate weight of the primary particles that can be obtained, and this results in a cumbersome manufacturing process. On the other hand, a dispersion concentration greater than 70%, when dispersed in water, fails to produce the necessary level of fluidity for the coating. Thus, either extreme is undesirable.

As indicated in the foregoing, primary particles, in a dispersed state, can be obtained by mixing water-insoluble particles and polyvalent carboxylic acid resin in water and by letting the mixture stand with appropriate stirring. The result is primary particles of water-insoluble particles on whose surfaces a thin film of polyvalent carboxylic acid resin is adsorbed.

The reason for the formation of primary particles in this manner is based on the present inventors' experimental observation that, while the poor affinity and wettability between the surfaces of water-insoluble particles and the colored paint (dispersion-stabilized emulsion resin containing colored pigments—more on this later) makes it difficult to form a coating of a colored paint directly on the surfaces of particles, by causing the adsorption of polyvalent carboxylic acid resin on the surfaces of water-insoluble particles to occur, as in this invention, it is possible to improve the affinity and wettability of the water-insoluble particles with the colored paint. The result is favorable production of particles whose surfaces are sufficiently coated with a colored paint.

As a next step, a dispersion-stabilized emulsion resin containing a colored pigment is mixed in the dispersion liquid in which primary particles are formed.

Any of the following known colored pigments can suitably be used without any particular restriction: titanium dioxide, titanium yellow, zinc white, red iron oxide, Prussian blue, chrome yellow, zinc chromate, ultramarine blue, barite powder, manganese violet, carbon black, and other inorganic pigments, hansa yellow, benzene yellow, toluidine red, phthalocyanine blue, phthalocyanine green, dioxazine violet, and other organic pigments.

Further, barite, calcium carbonate, clay, talc, and other extender pigments can be used in conjunction with the above colored pigments.

Any emulsion resin whose emulsification stability is inhibited by the presence of metal ions can be used, so that the resin adheres to the surfaces of said primary particles either by coagulation or in a gel state. Examples include: acryl, styrene acryl, polyester, polyurethane, vinyl chloride-vinyl acetate copolymer, vinyl chloride-acryl copolymer, ethylene-vinyl acetate copolymer, and other synthetic resins; mastic, alkaloyd, benzoin, dragon blood, elemi sandrach, and other emulsions of naturally occurring resins. These substances can be used without any particular restriction.

A surfactant is used in these types of emulsion resins in order to stabilize their dispersion state.

Any of the known surfactants, either anion-based or cation-based, can be used suitably without any particular restriction.

The amount of a surfactant added should be less than 1% by weight relative to the amount of said emulsion resin. The grain size of the emulsion resin should be less than 0.1 μm in order to destabilize the emulsion relative to the metal ions. However, there are no particular restrictions on the type of surfactant used.

Further, ordinary known additives, such as a defoaming agent or a film formation inducer, can be added to the emulsion resin as needed.

The amount of colored pigments that is dispersed in a stabilized manner in the emulsion resin should be 2–300 parts by weight relative to 100 parts by weight of solid emulsion resin. However, there are no particular restrictions on the amount of colored pigments that can be mixed.

The emulsion resin that contains the colored pigment described above is mixed in the dispersion liquid in which said primary particles are dispersed.

The desired mixing rate is 1–200 parts by weight, and preferably 10–100 parts by weight, of emulsion resin (on a solid basis) relative to 100 parts by weight of the water-insoluble particles to be coated.

The reason is that an emulsion resin amount less than 1 part by weight relative to the mount of water-insoluble particles is insufficient to effect the coating of colored pigments on the surfaces of the primary particles and fails to produce good-quality colored particles. On the other hand, an emulsion resin amount greater than 200 parts by weight produces a fine gel-like substance in which the particles of the emulsion resin, not contributing to the coating, are coagulated. This fails to produce clear marble-like multi-color patterns, which are the object of the present invention. Thus, either extreme is undesirable.

The emulsion resin containing colored pigments is mixed in a dispersion liquid of primary particles. After stirring the mixture, a metal salt is added to the mixture.

Any of the following metal salts can suitably be used without restriction: calcium chloride, barium chloride, aluminum sulfate, cuprous sulfate, ferric chloride, silver nitrate, and lead acetate.

The reason for the addition of a metal salt is to cause the precipitation of the emulsion resin containing the above-described colored pigments on the surfaces of the primary particles in order to obtain colored particles that result from the formation of a colored coating on the surfaces of primary particles.

The amount of metal salt to be added depends on the type of emulsion resin used. The appropriate amount is that which causes coagulation and gel formation when the emulsion resin and the metal salt are mixed.

It is possible to add water to the metal salt so that it can be added as an aqueous solution. In this case, for the stability of particles the ratio between emulsion resin solution and aqueous metal salt solution by weight should be 7:3–3:7, and preferably 6:4–5:5. However, there are no particular restrictions on the ratio to be used.

As the foregoing indicates, the addition of a metal salt causes the deposition of the colored paint on the surfaces of primary particles by salting out. The result is colored particles whose surfaces are coated with the colored paint.

The average grain size of these colored particles should be 10–200 μm, preferably 20–100 μm.

The reason is that, when colored particles of different colors are formulated and mixed based on the method described above, a grain size less than 10 μm is visually undetectable and causes a complete blending of particles of different colors. The result is that the color pattern thus produced is not a marble-like multi-color pattern. On the other hand, a grain size greater than 200 μm produces a poor color distribution of the multi-color pattern. This fails to produce finely detailed marble-like patterns or fabric or suede-type patterns that excel in decorative quality. Further, when dried, the surface of the paint feels rough rather than soft. Thus, both extremes are undesirable.

A grain size 20–100 μm of the colored particles results in an excellent feel and a suede-like texture, which is desirable.

FIG. 1 shows a schematic diagram of the colored particle manufacturing process of the present invention as described above. The following is a key for the reference numerals in FIG. 1:

| Reference Numeral | Item |
| --- | --- |
| 101 | Water-insoluble particles |
| 102 | Polyvalent carboxylic acid resin |
| 103 | Mixing |
| 104 | Water-insoluble particles |
| 105 | Primary particle |
| 106 | Polyvalent carboxylic acid resin |
| 107 | Primary particle |
| 108 | Dispersion-stabilized emulsion resin containing colored pigments |
| 109 | Metal salt |
| 110 | Colored coating |
| 111 | Colored particle |

The following is a detailed description of the constitution of the suede-type paint constituent using the colored particles obtained by the above method.

The dispersion liquid of the colored particles obtained by the above manufacturing method can be used "as is." Alternatively, colored particles can be extracted from the dispersion liquid and kneaded in an aqueous varnish in order to produce paint constituents.

Whether the dispersion liquid of colored particles is used directly or mixed with aqueous varnish, any of the ordinary paint additives can be used, such as defoaming agents, thickeners, suffactants, and preservatives.

In the approach in which colored particles are extracted and mixed with aqueous varnish in order to produce paint constituents, there are no particular restrictions on the type of aqueous varnish used. Emulsion resins and water-soluble resins, such as acryl or vinyl acetate-based resins, among others, can suitably be used.

Further, by varying the hardness or softness of the aqueous varnish or colored particles, it is possible to produce coatings with give different feels to the touch.

Further, in the present invention colored mica can be mixed with the aforementioned colored particles in order to produce paint constituents.

For the purpose of this discussion colored mica is one in which burning-in melamine resin is coated on the surface. The preferable grain size of the mica is 10–2000 µm. Specifically, Color Mica (trade name, made by Sanyo Chemical Co., Ltd.) can be indicated. However, there are no particular restrictions on the type of color mica that can be used.

Thus, by mixing color mica with colored particles in order to produce paint constituents, it is possible to endow marble-like multi-color patterns on the dried paint film and provide pearl-like luster, thus obtaining a paint with excellent decorative characteristics.

As described in detail above, this invention relates to a colored particle manufacturing method in which water-insoluble particles and polyvalent carboxylic acid resin, either water-soluble or water-dispersing, with a 20–120 acid value (on a solid basis) are mixed in water; and alter primary particles are formed through the adsorption of the polyvalent carboxylic acid resin on the surfaces of the water-insoluble particles, a dispersion-stabilized emulsion resin containing colored pigments is mixed in the dispersion liquid; after which a metal salt is added to the mixture system. The result is colored particles with a 10–200 µm average grain size with a surface coating of a colored material. When applied as a paint, the result is detailed marble-like multi-color patterns, distinct from conventional mono-color paint. The new paint offers an appropriate level of roughness to the touch and can produce a vivid accent. The manufacturing method described herein is capable of producing, in high yields, colored particles with a 10–200 µm average grain size that can be used to formulate suede-type paint constituents with excellent decorative properties. Further, the manufacturing method offers the additional benefits of great simplicity and efficiency.

Further, the colored particles excelling in decorative properties can be produced in a shorter production process compared with the conventional method, and the amount of plasticizer used to coat the colored paint can be reduced. The result is an improved stain-proof capacity of the paint coating in which the colored particles are an essential ingredient, and is an environmentally benign product.

Further, because the suede-type paint constituent is characterized in that colored particles with an average grain size of 10–200 µm are dispersed as an essential constituent, by mixing colored particles of different colors it is possible to obtain suede-type multi-color patterns. The result is suede-type paint constituents that offer a detailed "marble-like" external appearance, an appropriate amount of roughness to the touch, and which are capable of expressing a vivid accent for an excellent decorative effect.

Further, the use of inorganic particles as water-insoluble particles endows a fire-retardant capacity on the colored particles themselves, thus preventing combustion in the event of a fire. The mixture produces little toxic gas during combustion, and is a paint with an excellent, marble-like multi-color, and highly decorative patterns. The present invention provides the advantage of being able to formulate excellent interior decoration paints that can contribute to the protection of the global environment.

While the preferred embodiment of the invention has been illustrated and described, it will be appreciated that various changes can be made therein without departing from the spirit and scope of the invention.

EXAMPLES

The following clarifies, with reference to examples and comparison examples, the manufacturing method for the colored particles related to this invention and the benefits of suede-type paint constituents using the colored particles obtained by this method. The present invention, however, is by no means limited by the examples described below.

Example 1

As water-insoluble particles, a vinyl chloride polymer resin (trade name: Zeon 103ZXA, from Nippon Zeon Co., Ltd.) with a average grain size of 40 µm, 150 parts by weight, was dispersed in water at a concentration of 60%. Polyvalent carboxylic acid resin [acryl resin, acid value: 47.2 (trade name: Polysol OLX-4320-13), 32.9% solid, from Showa Kobunshi Co., Ltd.], 16.0 parts by weight, was mixed in this mixture. The mixture was stirred.

The result was primary particles produced by the adsorption of the polyvalent carboxylic acid resin on the surfaces of vinyl chloride polymer resin particles.

In the next step, styrene acryl emulsion synthetic resin [styrene acryl emulsion with 47% non-volatile constituents (trade name: Acronal YJ1210D, Mitsubishi Petrochemical Badische Co., Ltd.), average grain size: 0.07 µm], 80 parts by weight, containing 40 parts by weight of titanium dioxide, was mixed as colored pigments in the dispersion liquid. The mixture was stirred. Further, as a metal salt, calcium chloride, 0.6 parts by weight, was mixed in the mixture system in order to precipitate the emulsion resin, thus obtaining white colored particles with a 45 μm average grain size.

Further, using the above method, except that 10 parts by weight of carbon black instead of titanium dioxide were used, a dispersion liquid of black colored particles with a 47 μm average grain size was obtained.

The paint constituent for Example 1 was obtained by mixing 50 parts by weight of the white particles extracted from the dispersion liquid described above and 50 parts by weight of black particles, and by blending 50 parts by weight of aqueous varnish with 55% non-volatile constituents.

Example 2

As water-insoluble particles, calcium carbonate (NN200, Nitto Funka Co., Ltd.) with an average grain size of 15 μm, 100 parts by weight, was dispersed in water at a concentration of 50% to obtain a dispersion liquid.

Polyvalent carboxylic acid resin [trade name: Cogum HW301, acryl resin, acid value: 20.0 (on a solid basis), 50.0% resin solid, from Showa Kobunshi Co., Ltd.], 2.8 parts by weight, was mixed in this mixture. The mixture was stirred. The result was primary particles produced by the adsorption of the polyvalent carboxylic acid resin on the surfaces of particles.

In the next step, an emulsion resin [acryl resin (trade name: Nikasol RX876, Nippon Carbite Industry Co., Ltd.), average grain size: 0.1 μm], 26.1 parts by weight, containing 13.2 parts by weight of titanium dioxide, was mixed as colored pigments in the dispersion liquid. The mixture was stirred. Further, as a metal salt, calcium chloride, 0.6 parts by weight, was mixed in the mixture system in order to precipitate the emulsion resin, thus obtaining a dispersion liquid of white colored particles with a 22 μm average grain size.

Further, using the above method, except that carbon black was used instead of titanium dioxide, a dispersion liquid of black colored particles with a 20 μm average grain size was obtained.

The paint constituent for Example 2 was obtained by mixing 50 parts by weight of the white particles extracted from the dispersion liquid described above and 50 parts by weight of black particles, and by blending 50 parts by weight of aqueous varnish with 55% non-volatile constituents.

Example 3

Dispersion liquids of black and white particles, similar to Example 2, were obtained except that calcium carbonate (KANSUI #65/50, Nitto Funka Co., Ltd.) with a 160 μm average grain size was used. By extracting colored particles from these dispersion liquids, paint constituents for Example 3 were obtained using a protocol similar to Example 2.

Example 4

A paint constituent for Example 4 was obtained by mixing black-colored mica (trade name: Color Mica #655, Sanyo Chemical Co., Ltd.), 5 parts by weight, with 100 parts by weight of the white particle and 10 parts by weight of the black particles prepared in Example 2, and by blending this mixture with 50 parts by weight of aqueous varnish with 55% non-volatile constituents.

Example 5

As water-insoluble particles, 100 parts by weight of an acryl-based resin [trade name: Tafuchick AR (from Toyobo Co., Ltd.)]with an average grain size of 20 μm, were dispersed in water at a concentration of 40%.

Polyvalent carboxylic acid resin [acryl resin, acid value: 100.0 (on a solid basis), [trade name: Arolon 440 (50% resin solid) from Japan Catalyst Co., Ltd.], 30 parts by weight, was mixed in this mixture. The mixture was stirred. The result was primary particles produced by the adsorption of the polyvalent carboxylic acid resin on the surfaces of particles.

In the next step, an emulsion resin [acryl resin (trade name: Nikasol RX876, Nippon Carbite Industry Co., Ltd.)], 50.0 parts by weight, containing 25.0 parts by weight of titanium dioxide, was mixed as colored pigments in the dispersion liquid. The mixture was stirred. Further, as a metal salt, aluminum sulfate, 1.5 parts by weight, was mixed in the mixture system in order to precipitate the emulsion resin, thus obtaining a dispersion liquid of white colored particles with a 24 μm average grain size.

Further, using the above method, except that carbon black was used instead of titanium dioxide, a dispersion liquid of black colored particles with a 23 μm average grain size was obtained.

The paint constituent for Example 5 was obtained by mixing 50 parts by weight of the white particles extracted from the dispersion liquid described above and 50 parts by weight of black particles, and by blending 50 parts by weight of aqueous varnish with 55% non-volatile constituents.

Example 6

Dispersion liquids of black and white particles, similar to Example 5, were obtained except that a polyvalent carboxylic acid resin with a 120 acid value (on a 50% solid basis) was used by neutralizing a vinyl acetate resin [trade name: Vinyrol OLX-5895, Showa Kobunshi Co., Ltd.] with ammonia water and diethanol amine (neutralization ratio: 100%). By extracting colored particles from these dispersion liquids, paint constituents for Example 6 were obtained using a protocol similar to Example 5.

Example 7

Dispersion liquids of black and white particles, similar to Example 6, were obtained except that 2 parts by weight of di-2-ethylhexyl phthalate were added as a plasticizer to the polyvalent carboxylic acid resin mentioned above. By extracting colored particles from these dispersion liquids, paint constituents for Example 7 were obtained using a protocol similar to Example 6.

Example 8

Dispersion liquids of white particles, with a 45 μm average grain size, and black particles, with a 47 μm average grain size, similar to Example 1, were obtained except that 50.0 parts by weight of an alkyd resin [trade name: Watersol S346 from Dai Nippon Ink Co., Ltd., 65% solid constituents, 45 solid acid value]. By extracting colored particles from these dispersion liquids, paint constituents for Example 8 were obtained using a protocol similar to Example 1.

Comparison Example 1

A vinyl chloride polymer resin (trade name: Zeon 103ZXA, from Nippon Zeon Co., Ltd.) with an average grain size of 40 μm, 150 parts by weight, was dispersed in water at a concentration of 60%.

A synthetic emulsion resin [styrene acryl emulsion with 47% non-volatile constituents (trade name: Acronal YJ1210D, Mitsubishi Petrochemical Badische Co., Ltd.)], 80 parts by weight containing 40 parts by weight of titanium dioxide, was mixed in the aforementioned vinyl chloride-based synthetic resin containing a plasticizer. After adding an appropriate amount of water to this mixture system, as a metal salt, calcium chloride, 1.8 parts by weight, was mixed in the mixture system. The result was a dispersion liquid of white particles with a 40 μm average grain size.

Further, using the above method, except that 10 parts by weight of carbon black were used as a colored pigment instead of titanium dioxide, a dispersion liquid of black colored particles with a 40 μm average grain size was obtained. The paint constituent for Comparison Example 1 was obtained by mixing 50 parts by weight of the white particles extracted from the dispersion liquid described above and 50 parts by weight of black particles, and by blending 50 parts by weight of aqueous varnish with 55% non-volatile constituents.

Comparison Example 2

As water-insoluble particles, naturally occurring pumice stone particle (Kagalite K-10, Silver Industry Co., Ltd.) with an average grain size of 40 μm, 100 parts by weight, was dispersed in water at a concentration of 50%.

An emulsion resin [an acryl resin (trade name: Nikasol RX876, Nippon Carbite Industry Co., Ltd.), average grain size: 0.1 μm], 26.1 parts by weight containing 13.2 parts by weight of titanium dioxide, was mixed as colored pigments in the dispersion liquid. The mixture was stirred. Further, as a metal salt, calcium chloride, 0.6 parts by weight, was mixed in the mixture system in order to precipitate the emulsion resin. The result was a dispersion liquid of white particles with a 40 μm average grain size.

Further, using the above method, except that carbon black was used as a colored pigment instead of titanium dioxide, a dispersion liquid of black colored particles with a 40 μm average grain size was obtained. The paint constituent for Comparison Example 2 was obtained by mixing 50 parts by weight of the white particles extracted from the dispersion liquid described above and 50 parts by weight of black particles, and by blending 40 parts by weight of aqueous varnish with 55% non-volatile constituents.

Comparison Example 3

Dispersion liquids of white and black particles, similar to Example 1, were obtained except that the acid value of polyvalent carboxylic acid resin used was 130. By extracting colored particles from these dispersion liquids, paint constituents for Comparison Example 3 were obtained using a protocol similar to Example 1.

Comparison Example 4

Dispersion liquids of white and black particles, similar to Example 1, were obtained except that an acryl resin, similar to Example 5, was used instead of the vinyl chloride polymer. Paint constituents for Comparison Example 4 were obtained using a protocol similar to Comparison Example 1.

Comparison Example 5

Paint constituents for Comparison Example 5, similar to Example 1, were obtained, except that a water-insoluble acryl-based resin (Cogum HW-310, 47.2 acid value) with a 0 alkali neutralization ratio was used as a polyvalent carboxylic acid resin.

Test 1

The yields (as measured by the percentage of colored particles in the total population of particles in a 4 cm² area observed under a 20×magnification microscope photograph) of the white and black particles obtained in Examples 1–7 and Comparison Examples 1–5 were tested. The results are shown in Table 1.

TABLE 1

|  | Yield (%) of Colored Particles |
|---|---|
| Example 1 | 98 |
| Example 2 | 100 |
| Example 3 | 100 |
| Example 4 | — |
| Example 5 | 99 |
| Example 6 | 95 |
| Example 7 | 100 |
| Example 8 | 100 |
| Comparison Example 1 | 30 |
| Comparison Example 2 | 10 |
| Comparison Example 3 | 40 |
| Comparison Example 4 | 20 |
| Comparison Example | 0 |

Test 2

The paint constituents obtained in Examples 1–7 and Comparison Examples 1–5 were applied twice to the surfaces of slate test plates tested (applying 200 g per application per 1 m², two times for a total of 400 g), and the appearance and the feel of the resulting paint coating were checked.

The appearance was tested by visual inspection in terms of color clarity two hours after the paint was applied.

The feel was observed and evaluated in terms of the presence or absence of surface roughness by touching the test pieces 24 hours after paint application.

For evaluation, 20 male and 20 female panelists were selected at random and the test pieces were evaluated on a scale of 10, in whole numbers, with the best item receiving 10 points and the worst item 0 points. Table 2 shows the average scores.

Particles were observed under a microscope to determine whether or not they were completely coated by a paint. The samples were rated in terms of O (completely coated), Δ (fair), and X (poor). These results are also shown in Table 2. Further, as a particle strength test, the test pieces were scratched with fingernails 30 days after paint application in order to determine whether or not scratching crushed the particles. The results were rated in terms of O (not crushed), Δ (fair), and X (poor), and are shown in Table 2.

TABLE 2

|  | Appearance | Feel | Coating | Particle Strength |
|---|---|---|---|---|
| Example 1 | 8.7 | 9.2 | O | O |
| Example 2 | 7.4 | 10.0 | O | O |

TABLE 2-continued

|  | Appearance | Feel | Coating | Particle Strength |
|---|---|---|---|---|
| Example 3 | 8.6 | 6.2 | O | O |
| Example 4 | 9.5 | 8.8 | — | — |
| Example 5 | 7.6 | 10.0 | O | O |
| Example 6 | 7.4 | 9.8 | O | O |
| Example 7 | 8.0 | 9.8 | O | O |
| Example 8 | 7.4 | 9.6 | O | O |
| Comparison Example 1 | 1.2 | 8.0 | X | O |
| Comparison Example 2 | 1.0 | 9.2 | X | O |
| Comparison Example 3 | 1.5 | 8.6 | X | O |
| Comparison Example 4 | 1.0 | 8.4 | X | O |
| Comparison Example 5 | 0.0 | 0.0 | X | — |

As indicated in Tables 1 and 2, given the same water-soluble particles (vinyl chloride polymer resin—Example 1 and Comparison Example 1), the formation of primary particles through the use of a polyvalem carboxylic acid resin, followed by coating with a colored paint (Example 1) produced colored particles in substantially high yields.

Further, in the conventional method previously disclosed by the inventors of the present invention, in which coating with a colored paint is performed without conducting adsorption using a polyvalent carboxylic acid resin, and in which particles other than a vinyl craoride-based resin containing a plasticizer are used (Comparison Examples 2 and 4), the result is extremely poor coating with colored paint and extremely low yields of colored particles.

Further, the provision of colored mica as well as colored particles as an essential paint constituent (Example 4) produces an extremely favorable paint coat appearance.

A polyvalent carboxylic acid resin acid value greater than 120 (Comparison Example 3) reduces both the coating efficiency and production yield of colored particles.

The use of water-insoluble polyvalent carboxylic acid resin (Comparison Example 5) prevents the polyvalent carboxylic acid resin from mixing in water. This causes the coagulation of particles, and the resulting gel-formation inhibits the coating with a colored paint.

Paint constituents (Comparison Examples 1 through 5) in which colored paints are inadequately coated produce paint films that have poor appearance and feel.

The white and black particles obtained in Comparison Example 1 contained a large population of particles with incomplete colored paint coating. This can be a problem in practical utilization.

The white and black particles obtained in Comparison Example 2 also contained particles with incomplete colored paint coating, which would not be acceptable for practical utilization.

The example of the invention in which an exclusive property or privilege is claimed are defined as follows:

We claim:

1. A method for manufacture of colored particles, comprising mixing in water water-insoluble particles and a polyvalent carboxylic acid resin with an acid value (solid-based) of about 20–120, the resin selected from the group consisting of water-soluble and water-dispersable resins, to form primary coated particles; mixing the primary coated particles with dispersion-stabilized emulsion resin the dispersion-stabilized emulsion resin containing a colored pigment; and adding a metal salt to obtain colored particles with an average particle size of about 10–200 μm with a surface colored coating.

2. The method for the manufacture of colored particles of claim 1, wherein the polyvalent carboxylic acid resin is selected from the group consisting of partially and wholly alkali-neutralized acids.

3. The method for manufacture of colored particles of claim 1 or 2, characterized in that said water-insoluble particles are synthetic resin particles.

4. The method for manufacture of colored particles of claim 1 or 2, characterized in that said water-insoluble particles are inorganic particles.

5. A method of making an aqueous dispersion of colored particles comprising water-insoluble particles in the size range 10–200 μm, said particles coated with a colored film comprising a pigment, the method comprising:

(a) mixing the water-insoluble particles with polyvalent carboxylic acid resin in an aqueous medium to form a resin coating on the particles;

(b) adding a dispersion-stabilized emulsion resin containing a colored pigment to the resin-coated particles; and (c) precipitating the emulsion resin containing the colored pigment onto resin coated particulate surfaces.

6. The method of claim 5, wherein the particles comprise 30–70 wt % of the dispersion.

7. The method of claim 5, wherein the particles comprise particulates of synthetic resin.

8. The method of claim 5, wherein the polyvalent carboxylic acid resin has an acid value in the range 20–120, and the resin is selected from the water-soluble and water dispersible resins.

9. The method of claim 5, wherein the precipitating of the emulsion resin is by adding a metal salt.

10. The method of claim 5, wherein the adding includes adding 1–200 parts by weight of emulsion resin (on a solid basis) for each 100 parts by weight of the water-insoluble particles.

11. The method of claim 5, wherein the water-soluble particles comprise colored mica.

12. The method of claim 11, wherein the grain size of the colored mica is in the range 10–2,000 μm.

13. A method of making a coating of suede-like texture on a substrate surface, the method comprising applying a coating of a dispersion to the substrate surface, the dispersion comprising: water-insoluble particulates having an average grain size of 10–200 μm, with a colored coating over surfaces of the water-insoluble particulates, the colored coating applied to the particulates by a process comprising:

(a) mixing the water-insoluble particulates with polyvalent carboxylic acid resin in an aqueous medium to form a resin coating on the particulates;

(b) adding a dispersion-stabilized emulsion resin comprising a colored pigment to the resin-coated particulates; and (c) precipitating the emulsion resin containing the colored pigment onto the resin-coated particulate surfaces.

14. The method of claim 13, wherein the process of applying a colored coating further comprises adding colored mica particles.

15. The method of claim 14, wherein the colored mica particles comprise burned-in melamine resin on surfaces of the mica particles.

16. The method of claim 14, wherein the average grain size of the mica is in the range 10–2,000 μm.

17. The method of claim 13, wherein the applying of the coating of the dispersion comprises making marble-like multi-colored patterns on the substrate surface.

* * * * *

UNITED STATES PATENT AND TRADEMARK OFFICE
CERTIFICATE OF CORRECTION

PATENT NO. : 5,621,023
DATED : April 15, 1997
INVENTOR(S) : Y. Nishimura et al.

It is certified that error appears in the above-indentified patent and that said Letters Patent is hereby corrected as shown below:

| COLUMN | LINE | | |
|---|---|---|---|
| [75] | Inventors | | "Yoshihiko Nishimura, Toyonaka; Tadamitsu Hirata, Hirakata," should read --Yoshihiko Nishimura, Osaka; Tadamitsu Hirata, Osaka,-- |
| [56] | Refs. Cited (Foreign Pat. | | "3-137170" should read --H 2-137170-- |
| 13 (Claim 1, | 63 line 7) | | "resin the" should read --resin, the-- |
| 14 (Claim 11, | 35 line 1) | | "water-soluble" should read --water-insoluble-- |

UNITED STATES PATENT AND TRADEMARK OFFICE
CERTIFICATE OF CORRECTION

PATENT NO. : 5,621,023
DATED : April 15, 1997
INVENTOR(S) : Y. Nishimura et al.

It is certified that error appears in the above-indentified patent and that said Letters Patent is hereby corrected as shown below:

| COLUMN | LINE | |
|---|---|---|
| 14 | 42 | Begin a new paragraph with: |
| Claim 13, | line 4 | "water-insoluble particulates having..." |

Signed and Sealed this

Eighth Day of July, 1997

Attest:

BRUCE LEHMAN

*Attesting Officer*      *Commissioner of Patents and Trademarks*